(12) United States Patent
Huang et al.

(10) Patent No.: US 10,664,030 B2
(45) Date of Patent: May 26, 2020

(54) SYSTEM AND METHOD FOR DYNAMIC POWER CAPPING AND LOAD BALANCE MANAGEMENT FOR A MULTI-NODE SYSTEM

(71) Applicant: QUANTA COMPUTER INC., Taoyuan (TW)

(72) Inventors: Jen-Hsuen Huang, Taoyuan (TW); Fa-Da Lin, Taoyuan (TW); Yi-Ping Lin, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 261 days.

(21) Appl. No.: 15/855,790

(22) Filed: Dec. 27, 2017

(65) Prior Publication Data
US 2018/0307288 A1   Oct. 25, 2018

Related U.S. Application Data

(60) Provisional application No. 62/487,053, filed on Apr. 19, 2017.

(51) Int. Cl.
| | |
|---|---|
| *G06F 1/26* | (2006.01) |
| *G06F 1/28* | (2006.01) |
| *G06F 1/3203* | (2019.01) |
| *G06F 1/3206* | (2019.01) |
| *G06F 11/30* | (2006.01) |

(52) U.S. Cl.
CPC ............... *G06F 1/266* (2013.01); *G06F 1/28* (2013.01); *G06F 1/3203* (2013.01); *G06F 1/26* (2013.01); *G06F 1/3206* (2013.01); *G06F 11/3062* (2013.01)

(58) Field of Classification Search
CPC .......... G06F 1/266; G06F 1/28; G06F 1/3203; G06F 1/26; G06F 1/3206; G06F 11/3062
USPC ................................................. 713/300, 310
See application file for complete search history.

(56) References Cited

U.S. PATENT DOCUMENTS

| | | | | |
|---|---|---|---|---|
| 9,874,922 | B2* | 1/2018 | Varma | G06F 1/3206 |
| 2008/0263373 | A1* | 10/2008 | Meier | G06F 1/3203 |
| | | | | 713/300 |
| 2009/0113221 | A1* | 4/2009 | Holle | G06F 1/189 |
| | | | | 713/310 |
| 2011/0144818 | A1 | 6/2011 | Li et al. | |
| 2014/0067139 | A1 | 3/2014 | Berke et al. | |

(Continued)

OTHER PUBLICATIONS

Extended European Search Report for EP Application No. 18162848.8, dated Sep. 17, 2018.

*Primary Examiner* — Ji H Bae
(74) *Attorney, Agent, or Firm* — Nixon Peabody LLP; Zhou Lu

(57) ABSTRACT

A system and method to dynamically balance power to a multi-node system is disclosed. A chassis management controller is operable to regulate the power from a power source to each of the nodes. The chassis management controller determines a setting power for each nodes and a real power consumed by each node. The chassis management controller determines a next setting power for each node based on the real power and unused total power and total additional balance power for the plurality of nodes. The chassis management controller commands each node to regulate the power consumption of the node up to the setting power value.

17 Claims, 5 Drawing Sheets

(56) References Cited

U.S. PATENT DOCUMENTS

| | | | |
|---|---|---|---|
| 2014/0122910 A1* | 5/2014 | Chiu | G06F 1/3206 |
| | | | 713/323 |
| 2015/0177814 A1 | 6/2015 | Bailey et al. | |
| 2017/0255247 A1* | 9/2017 | Ardanaz | G06F 1/266 |
| 2019/0018469 A1* | 1/2019 | Su | G06F 1/3203 |

* cited by examiner

| 1st | SP | RP | SBPx | TBP | PUx | %(PUx) | ABPx | NSPx |
|---|---|---|---|---|---|---|---|---|
| Node1 | 500 | 500 | 150 | | 1 | 0.25 | 105 | 455 |
| Node2 | 400 | 400 | 120 | | 1 | 0.25 | 105 | 385 |
| Node3 | 300 | 300 | 90 | | 1 | 0.25 | 105 | 315 |
| Node4 | 200 | 200 | 60 | | 1 | 0.25 | 105 | 245 |
| Total | 1400 | 1400 | 420 | 420 | 4 | | 420 | 1400 |

| 2nd | SP | RP | SBPx | TBP | PUx | %(PUx) | ABPx | NSPx |
|---|---|---|---|---|---|---|---|---|
| Node1 | 455 | 455 | 136.5 | | 1 | 0.25 | 105 | 423.5 |
| Node2 | 385 | 385 | 115.5 | | 1 | 0.25 | 105 | 374.5 |
| Node3 | 315 | 315 | 94.5 | | 1 | 0.25 | 105 | 325.5 |
| Node4 | 245 | 245 | 73.5 | | 1 | 0.25 | 105 | 276.5 |
| Total | 1400 | 1400 | 420 | 420 | 4 | | 420 | 1400 |

| 1st | SP | RP | SBPx | TBP | PUx | %(PUx) | ABPx | NSPx |
|---|---|---|---|---|---|---|---|---|
| Node1 | 500.0 | 500.0 | 50.0 | | 1.00 | 0.26 | 61.1 | 511.1 |
| Node2 | 500.0 | 450.0 | 45.0 | | 0.90 | 0.24 | 54.9 | 459.9 |
| Node3 | 300.0 | 300.0 | 30.0 | | 1.00 | 0.26 | 61.1 | 331.1 |
| Node4 | 300.0 | 270.0 | 27.0 | | 0.90 | 0.24 | 54.9 | 297.9 |
| Total | 1600.0 | 1520.0 | 152.0 | 232.0 | 3.8 | | 232.0 | 1600.0 |

| 2nd | SP | RP | SBPx | TBP | PUx | %(PUx) | ABPx | NSPx |
|---|---|---|---|---|---|---|---|---|
| Node1 | 511.1 | 511.1 | 51.1 | | 1.00 | 0.26 | 60.8 | 520.8 |
| Node2 | 459.9 | 420.0 | 42.0 | | 0.91 | 0.24 | 55.5 | 433.5 |
| Node3 | 331.1 | 331.1 | 33.1 | | 1.00 | 0.26 | 60.8 | 358.8 |
| Node4 | 297.9 | 260.0 | 26.0 | | 0.87 | 0.23 | 53.0 | 287.0 |
| Total | 1600.0 | 1522.2 | 152.2 | 230.0 | 3.8 | | 230.0 | 1600.0 |

| 3rd | SP | RP | SBPx | TBP | PUx | %(PUx) | ABPx | NSPx |
|---|---|---|---|---|---|---|---|---|
| Node1 | 520.8 | 520.8 | 52.1 | | 1.00 | 0.26 | 56.2 | 524.9 |
| Node2 | 433.5 | 410.0 | 41.0 | | 0.95 | 0.25 | 53.1 | 422.1 |
| Node3 | 358.8 | 358.8 | 35.9 | | 1.00 | 0.26 | 56.2 | 379.1 |
| Node4 | 287.0 | 250.0 | 25.0 | | 0.87 | 0.23 | 48.9 | 273.9 |
| Total | 1600.0 | 1539.6 | 154.0 | 214.4 | 3.8 | | 214.4 | 1600.0 | ns # SYSTEM AND METHOD FOR DYNAMIC POWER CAPPING AND LOAD BALANCE MANAGEMENT FOR A MULTI-NODE SYSTEM

PRIORITY CLAIM

This application claims priority from U.S. Provisional Application No. 62/487,053, filed Apr. 19, 2017. The entirety of that application is hereby incorporated by reference.

TECHNICAL FIELD

The present disclosure relates generally to system for power management in a multi-node system. More particularly, aspects of this disclosure relate to a system that manages power distribution in a multi-node system based on dynamic balancing of power to nodes.

BACKGROUND

Power to different nodes or devices such as those on a computer motherboard is often centrally supplied by a power system unit (PSU). The PSU provides power for multiple nodes such as cores that constitute a processing unit on a computer motherboard. Often, another PSU is also connected to supply power to the nodes. In a two power supply system, if one PSU can afford a certain level of power consumption, the overall system may be designed so the total power consumption is below that certain level to avoid system failure if one of the PSUs fails. Generally, each PSU in such a system is configured to have enough power to allow operation of the multiple nodes at normal operation levels when the other PSU fails.

But in some conditions, the single PSU cannot supply enough power to maintain desired system operation. Under such a condition, power consumption of a processor will be limited by controlling the clock speed of the processor or simply limiting the power of the processor to a certain level. There are several known methods to limit power consumption among multiple cores of a processor. One method is to limit power to each node of a processor equally. Although this is simple to implement, the system power allocation is not optimized since nodes that require more power will not receive the necessary power, while unnecessary power may be supplied to nodes that are running below the power limit allocated by this division.

Another known method to insure adequate power is to set a power limitation of each node as dividing the overall power consumption by the number of nodes and arrive at a set power level for each node. The system meets the target power levels by a software algorithm run by the chassis management controller. The controller is limited to the chassis management controller (CMC), but it could be baseboard management controller (BMC) or the controller of PSU. Such a solution is simple to implement, but limits system design and ignores the real power usage of each node. For example, if it is desirable for the system to support a heavy loading Stock Keeping Unit (SKU) and expect system power fully utilized, the equitable distribution will not allow the heavy load to be sufficiently powered.

Thus, there is a need for a system to allow efficient balancing of power between multiple nodes. There is a further need for a system that allows power to be dynamically balanced between nodes in a multi-node system. There is a further need for a system that efficiently distributes surplus power among nodes in a multi-node system to fine tune power distribution.

SUMMARY

One disclosed example is a multi-node system that dynamically allocates power. The system includes a plurality of nodes and a power source providing power to each of the nodes. A chassis management controller is coupled to the power source. The chassis management controller is operable to regulate the power from the power source to each of the nodes. The chassis management controller balances the power supplied to each node by determining a setting power for each node and a real power consumed for each node. The chassis management controller determines a next setting power for each node based on the real power and unused total power and total additional balance power for the plurality of nodes. The chassis management controller will provide the next setting power value to the baseboard management controller of each node. The baseboard management controller will regulate power consumption to key components such as the CPU or memory up to the next setting power value of the nodes.

Another example is a method of managing power in a system including a plurality of nodes where each node consumes power. A setting power for each node and a real power consumed for each node is determined. A next setting power for each node is determined based on the real power and unused total power and total additional balance power for the plurality of nodes. The real power is regulated up to the next setting power value to each of the nodes.

Another example is power supply unit for allocating power to a plurality of nodes. The power supply unit includes a power supply circuit supplying power to each of the plurality of nodes. A chassis management controller regulates the power supply circuit. The chassis management controller is operative to determine the real power consumed by each of the nodes and determine the unused total power of all of the nodes. The chassis management controller determines additional balance power for each of the nodes. The chassis management controller determines the ratio of power usage for each of the nodes based on the real power consumed by the node and a setting power value for the node. The chassis management controller determines an add back balance power for each node based on the unused total power and the ratio of power usage. The chassis management controller determines a next setting power value for each node based on the real power consumed by the node, the additional balance power for the node and the add back balance power for the node. The chassis management controller will provide the next setting power value to the baseboard management controller of each node. The baseboard management controller will regulate key components power consumption up to the next setting power value of the nodes.

The above summary is not intended to represent each embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present invention when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
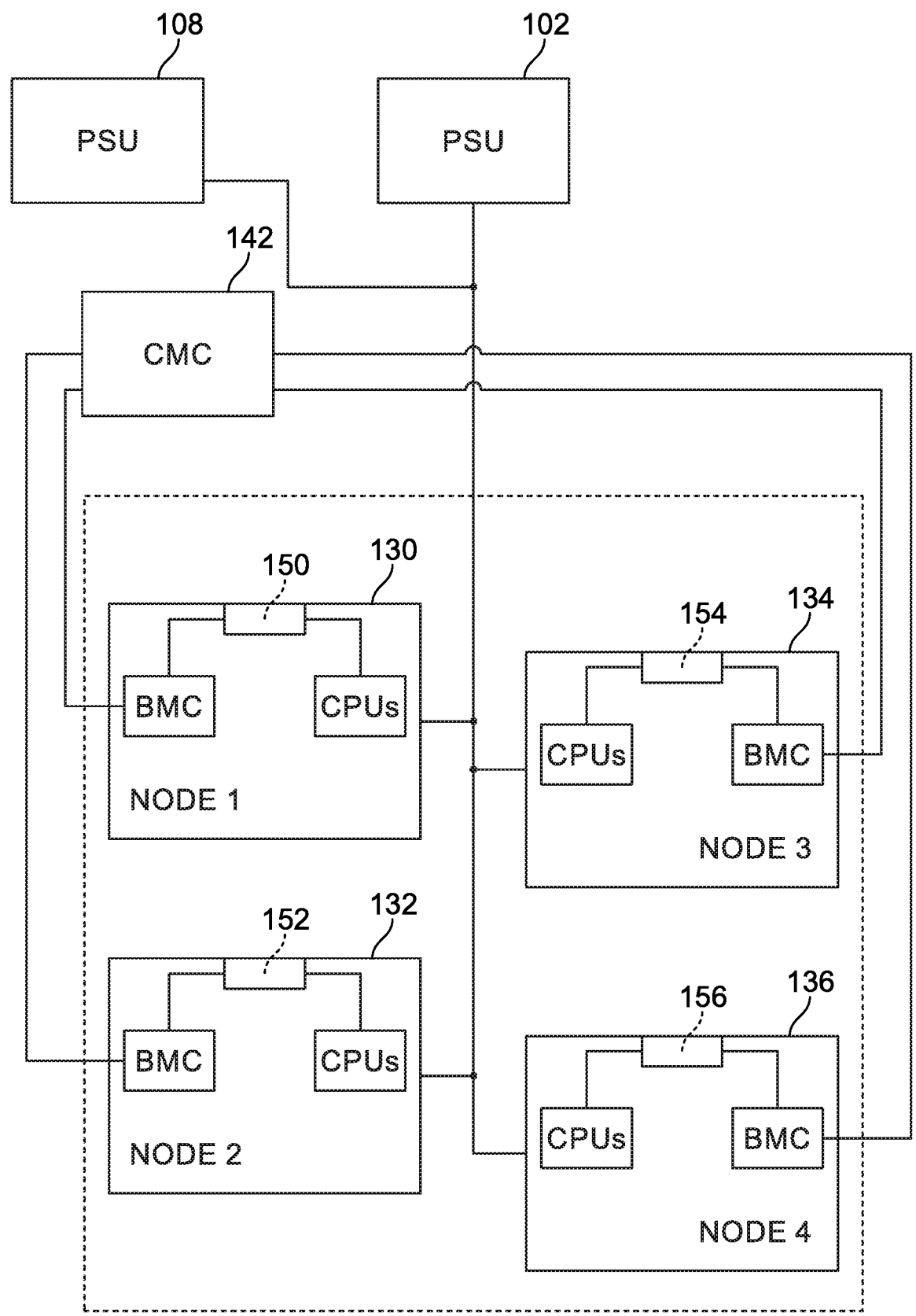
FIG. 1 is a block diagram of an example multi-node system with a power management system to dynamically balance power between the nodes.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present invention can be embodied in many different forms. There are shown in the drawings, and will herein be described in detail, representative embodiments with the understanding that the present disclosure is to be considered as an exemplification or illustration of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed: the singular includes the plural and vice versa; and the word "including" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

FIG. 1 shows a block diagram of an example system 100 that supports multiple nodes and is thus a multi-node system. The system 100 includes a power supply unit (PSU) 102 that supplies power to the components on the motherboard 100. A backup power supply unit 108 identical to the power supply unit 102 may be provided for backup power.

The system 100 includes multiple nodes such as nodes 130, 132, 134 and 136 in this example that constitute a multi-node system 140. Each of the nodes 130, 132, 134 and 136 is a motherboard and thus include a processor, a memory and a baseboard management controller. It is to be understood that the principles explained herein may be applied to power distribution for multi-node systems that have any number of nodes powered by one or more power supply units. The power consumption of the nodes 130, 132, 134 and 136 may be determined via current sensors 150, 152, 154 and 156 on the respective nodes 130, 132, 134 and 136. The outputs of the current sensors 150, 152, 154 and 156 are coupled to a chassis management controller 142 and may provide power consumption data for the chassis management controller 142 to allocate power to the nodes 130, 132, 134 and 136.

The system 100 in FIG. 1 may be part of a computing system that includes multi-node motherboards and other boards that perform other functions such as memory devices or interface devices. In this example, the nodes 130, 132, 134 and 136 of the multi-node system 140 are powered by the power supply unit 102. Thus, the chassis management controller 142 may regulate the power supplied to the nodes 130, 132, 134 and 136 and optionally other components on the system 100.

In this example, the chassis management controller 142 operates as a management controller and may include separate rewritable memory and permanent memory for application software. The chassis management controller 142 may also include communication interfaces that allows communication between the chassis management controller and a data bus such as a Power Management bus (PMbus) that may be coupled to a power controller of PSU. Another communication interfaces allow communication between chassis manager and a data bus such as a SMBus that may be coupled to BMC of MB. The chassis management controller 142 may receive performance data for multiple processors from the data bus for purposes such as network operation, administration, or trouble shooting. Of course, it is understood that any suitable controller may be used for the chassis management controller 142. For example, the functions of the chassis management controller 142 of monitoring and regulating power may be performed by one of the nodes such as the node 130 or as part of a baseboard management controller on one of the nodes or a power controller that may be part of the PSU 102.

The process of distributing power between multiple nodes in a system such as the system 100 by the chassis management controller 142 in this example allows dynamic balancing of power between the multiple nodes. The multi-node system that may be operated with dynamic power balancing includes a total number of nodes, n, and each node includes a node number x that is from 1 to n. For example, the four cores 130, 132, 134, and 136 of the system 100 in FIG. 1 may be designated as node 1, node 2, node 3 and node 4 respectively. A setting power (SP) for the system such as the system 100 is established. The setting power is the power value that is set to a certain power value to limit system power consumption. In this example, the cores of a processor such as the multi-node system 100 will decrease their operation rate to try to reach the setting power value for the node if power consumption is higher than the setting power. The setting power of each of the nodes is designated as SPx. Thus, in this example, the setting power for node 1 (SP1) could be 450 W.

The real power of the system is designated as RP. The real power for each node is designated as RPx. The real power is the power value that the system reads from the current sensors of the system such as the current sensors 150, 152, 154 and 156 of the system 100. Thus the real power for node 1 (RP1) could be 380 W indicating that the power consumed by the node is less than the setting power. The total power of the system is designated as TP. The total power of the system (TP) is determined by the total real power consumed by the n-node system (the sum of the real power of each node) in addition to the power of other boards and devices. The total real power consumed by the n-node system may be expressed by:

$$\Sigma_{x=1}^{n} RPx$$

The power of other boards and devices may be expressed as OP. The total power of the system (TP) may be measured by a current sensor of the power supply unit. Thus, the power of the other boards and devices (OP) may be determined by subtracting the total real power from the total power of the system. The total real power is determined by the controller such as the chassis management controller 142 based on the power data values read from the current sensors 150, 152, 154 and 156 on each of the respective nodes 130, 132, 134 and 136.

The unused total power of the multi-node system is designated as UTP. The unused total power is determined by determining the total power consumption that may be afforded by the power supply unit such as the power supply unit 102 designated as MOP (Max Output Power of the PSU or a power value that is determined to be safe for long-time running of the system) and subtracting the system total power (TP). Thus, the unused total power, UTP is determined by subtracting the total power of the system from the max output power (e.g., UTP=MOP−TP).

Additional balance power may then be supplied. The additional balance power for each node is designated as SBPx which is equivalent to the real power of the node multiplied by a coefficient y. Thus, SBPx=yRPx for each node. The coefficient y is a value higher than 0 and lower than 1 and may be a constant value or a dynamic value. For example, the coefficient y may be set at a relatively higher value to balance all available power between nodes but may be set at a relatively lower value to optimize power to certain high demand nodes while reducing power to low demand nodes. In this example, the additional balance power from node 1 (SBP1) assuming y is a fixed value of 0.1 may be determined as 0.1×380 W=38 W.

The additional balance power takes out a proportion designated as the y coefficient of node power before the power allocation process to constitute the power budget for balancing purposes. The total additional power budget for balance power is determined by adding the balance power for each of the nodes in the system. This is expressed as:

$$\Sigma_{x=1}^{n} yRPx$$

In the case where the power needs for all of the nodes exceed the available power from the power supply unit 102, the power supply unit 102 cannot afford any additional power for the nodes. In this instance, each of the setting power values for the nodes is reduced to provide unused total power for balancing purposes. The power reduced for each of the nodes is proportional to the load of each of the nodes. For example, a heavier loading node will supply more additional balance power. In some instances, a lighter loading node will not require full power, and thus the power budget may be arranged to supply more power to a node that requires more power reflecting available power from lighter loading nodes.

Thus the total balance power budget (TBP) is determined by taking the unused total power UTP and adding the balance power from each of the nodes. The total balance power budget is calculated by:

$$TBP = UTP + \Sigma_{x=1}^{n} SBPx = UTP + \Sigma_{x=1}^{n} yRPx$$

The degree of power usage for each of the nodes is designated as PUx, where the degree of power usage is the real power of the node (RPx) divided by the setting power of the node (SPx). Thus, the degree of power usage for node 1 could be 380/450=0.844. The degree of power usage may indicate how much power is required for each node. If the degree of power usage is one or greater than one for a node, this indicates that the node requires the entire setting power or more power than the value of the setting power for the node. In this example, the degree of power usage for node 1 is below 1 and thus the node requires less than the setting power.

The ratio of power usage for a node x in the system is designated as % (PUx) and may be determined by the power usage of the node divided by the total power usage of all the nodes. Thus, the node with the highest ratio of power usage indicates that the node is most in need of power compared with other nodes in the multi-node system. The ratio of power usage for a node is used to allocate the power budget reserved for system power balance. Thus, the higher the ratio of power usage for a node, the more power is budgeted to the node by the chassis management controller 142.

The balance power budget (ABP) for each node is designated as ABPx. The balance power budget is determined by multiplying the total balance power budget TBP by the ratio of power usage for the node. This may be expressed as:

$$ABPx = TBP * [\% (PUx)] = (UTP + \Sigma_{x=1}^{n} yRPx) * [\% (PUx)]$$

The system also determines the next setting power for each of the nodes NSPx. The next setting power is determined based on the subtracting the additional balance power (SBPx) of the node from the real power of the node (RPx) and adding the balance power budget for the node (APBx), This may be expressed as:

$$NSPx = RPx - SBPx + ABPx = RPx - yRPx + (UTP + \Sigma_{x=1}^{n} yRPx) * [\% (PUx)]$$

The next setting power is stored in the memory of the controller such as the chassis management controller 142 and is used for determining power reallocation between the nodes. Thus, the chassis management controller 142 causes the baseboard management controller to allocate power to each of the nodes 130, 132, 134 and 136 in accordance with the next setting power. The change in power for each of the nodes 130, 132, 134 and 136 allows for dynamic power balancing based on the power needs of the nodes.

Figures 2A, 2B, 3:
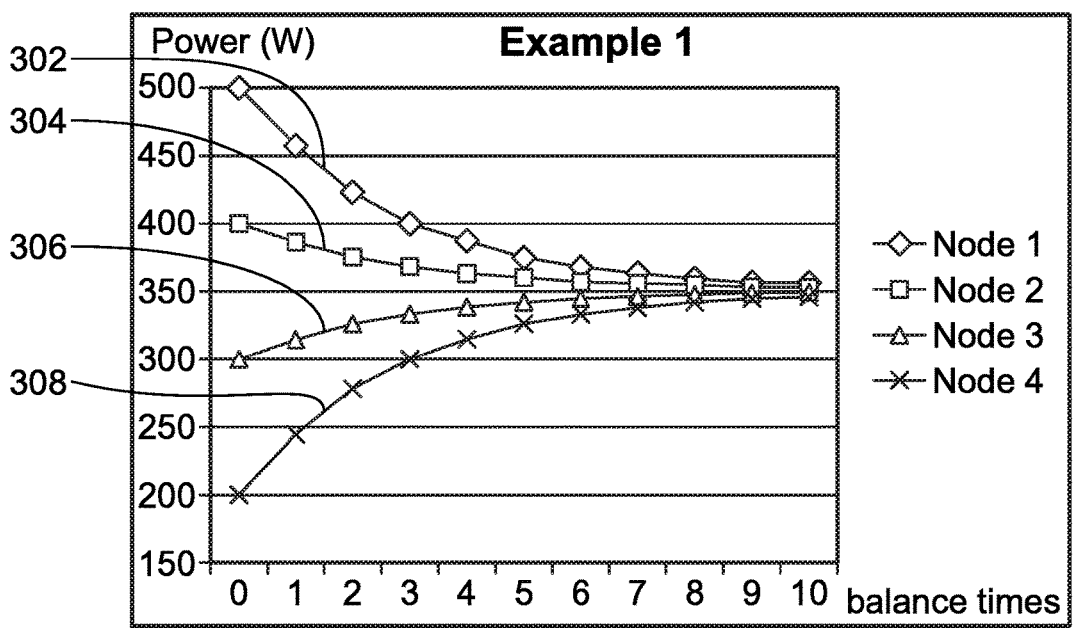
FIGS. 2A-2B are tables of power levels supplied to the nodes of the system in FIG. 1 in one operational example of balancing power by the dynamic power management system.
FIG. 3 is a graph of the power supplied to each of the nodes of the system in FIG. 1 after different balancing times based on the power levels in the tables in FIGS. 2A-2B.

FIG. 2A and FIG. 2B are tables that show the setting power, real power, additional balance power, degree of power usage, ratio of power usage, add balance power budget and the next setting power for each of the nodes 130, 132, 134 and 136 in the example motherboard 100 in FIG. 1. The values in FIG. 2A and FIG. 2B assume a high power use scenario where each of the nodes 130, 132, 134 and 136 in FIG. 1 are drawing a large amount of power. The values in FIG. 2A-2B are determined by the chassis management controller 142 based on the power consumed by each of the nodes as measured by the power monitors 150, 152, 154 and 156.

In this example, the unused total power UTP is zero. For each of the nodes the coefficient y is 0.3 in this example and thus the additional balance power for each of the nodes is 0.3 of the real power of the node. The ratio of power usage for each of the nodes is 1 indicating that the real power is the same as the setting power. At the beginning of the process as shown in FIG. 2A, the power for node 1 is 500 W, the power for node 2 is 400 W, the power for node 3 is 300 W and the power for node 4 is 200 W. The total balance power budget (TBP) is 420. Thus, the total node power consumption is 1400 W, and the power of other board and devices (OP) is 200 W. So total power consumption is 1600 W, it is the same as the available power of 1600 W and the unused total power UTP is thus zero.

FIG. 2B is a table showing the adjusted values for the nodes 130, 132, 134 and 136 after the above described power balancing process is performed by the chassis management controller 142. As may be seen in FIG. 2B in comparison to FIG. 2A, the setting power of the heaviest loaded nodes (node 1 and node 2) have been reduced and the setting power of the less loaded nodes (nodes 3 and 4) have been increased. For example, the next setting power of 455 from node 1 in the table in FIG. 2A is determined by taking the real power of 500 for node 1 and subtracting the additional balance power value (SBPx) of 150 and adding the balance power budget (ABPx) of 105 thus resulting in the next setting power of 455. As explained above, the additional balance power value (SBPx) of 150 is obtained by multiplying the real power of node 1, 500 in this example, by the coefficient y, which is 0.3 in this example, resulting in the additional balance power value of 150. As explained above, the balance power budget value of 105 is obtained by multiplying the total balance power budget of 420 by the ratio of power usage of 0.25 for node 1.

The next setting power values obtained in FIG. 2A are then used as the setting power values in the next iteration of the power balancing process as shown in FIG. 2B. As shown in FIG. 2B, after running the process a second time, the next setting power for the heavier load node 1 is further reduced to 423.5 while the next setting power for the lighter load node 4 is further increased to 276.5.

The chassis management controller 142 may then perform the same power balancing power using the next setting power values in FIG. 2B. The iterative performance of this process allows the dynamic allocation of power to the nodes 130, 132, 134 and 136 in FIG. 1.

FIG. 3 is a graph that shows the real power values of each of the nodes 130, 132, 134 and 136 after performing the power balancing process described above ten times. The real power values for the nodes 130, 132, 134 and 136 are represented by lines 300, 302, 304 and 306 respectively. As may be seen in FIG. 3, the system load balances as the real power values converge to 350 W for each of the nodes.

Figures 4A, 4B, 4C, 5:
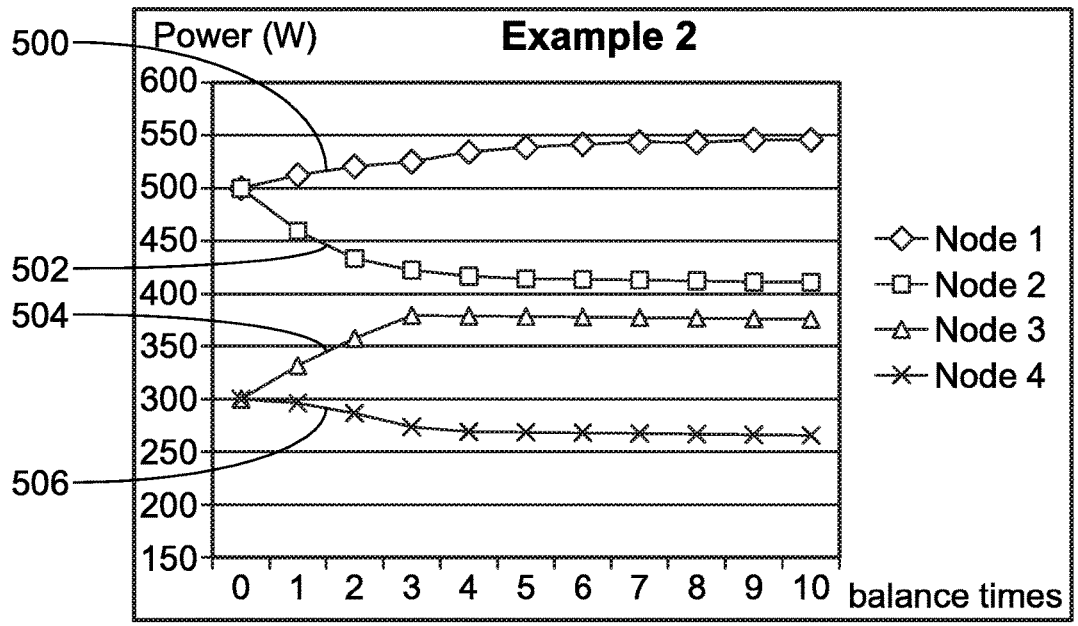
FIGS. 4A-4C are tables of power levels supplied to the nodes of the system in FIG. 1 in another operational example of balancing power by the dynamic power management system.
FIG. 5 is a graph of the power supplied to each of the nodes of the system in FIG. 1 after different balancing times based on the power levels in the tables in FIGS. 4A-4C.

Another example of load balancing is when certain nodes have lower power requirements. FIGS. 4A, 4B and 4C are tables that show the setting power, real power, additional balance power, degree of power usage, ratio of power usage, add balance power budget and the next setting power for each of the nodes 130, 132, 134 and 136 in the example system 100 in FIG. 1 during the performance of the power balancing process described above. In this example, the first and third nodes 130 and 134 are subject to higher power requirements while the second and fourth nodes 132 and 136 are subject to lower power requirements.

In this example, for each of the nodes the coefficient y is 0.1 and thus the additional balance power for each of the nodes is 0.1 of the real power. The ratio of power usage for each of the node 1 and node 3 is 1 indicating that the real power is the same as the setting power and they have higher power requirements. The ratio of power usage for the node 2 and node 4 is 0.9, indicating that they have lower power requirements than node 1 and node 3. As shown in FIG. 4A, at the beginning of the process, the setting power for node 1 is 500, the setting power for node 2 is 500, the setting power for node 3 is 300 and the setting power for node 4 is 300. In contrast, the real power is 500 for node 1, 450 for node 2, 300 for node 3 and 270 for node 4. The total balance power budget (TBP) is 232. The total node power consumption is 1600 W, and the power of other board and devices (OP) is 200 W. Thus, the total power consumption is the same as the available power of 1800 and the unused total power UTP is zero.

FIG. 4B is a table showing the adjusted values after the above described power balancing process is performed from the values in FIG. 4A. As may be seen in FIG. 4B in comparison to FIG. 4A, the setting power of the heaviest loaded nodes (nodes 1 and node 3) have been increased and the setting power of the lighter loaded nodes (nodes 2 and 4) have been decreased. For example, the next setting power of 511.1 from node 1 in the table in FIG. 4A is determined by taking the real power of 500 for node 1 and subtracting the additional balance power value (SBPx) of 50 and adding the balance power budget (ABPx) of 61.1 thus resulting in the next setting power of 511.1 for node 1. As explained above, the additional balance power value (SBPx) of 50 is obtained by multiplying the real power of node 1, 500 in this example, by the coefficient y, which is 0.1 in this example, resulting in the additional balance power value of 50 for node 1. As explained above, the balance power budget value of 61.1 is obtained by multiplying the total balance power budget of 232 by the ratio of power usage of 0.26 for node 1.

The next setting power values obtained in FIG. 4A are then used as the setting power values in the next iteration of the power balancing process as shown in FIG. 4B. As shown in FIG. 4B, the next setting power for the heavier load node 1 is further increased to 520.8.

Conversely, a node with lower power requirements results in a decrease of the next setting power value. For example, node 2 has a setting power of 459.9 in the table in FIG. 4B that is determined by taking the real power of 450 for node 2 as shown in FIG. 4A and subtracting the additional balance power value (SBPx) of 45 and adding the balance power budget (ABPx) of 54.9 thus resulting in the next setting power of 459.9 in FIG. 4B. As explained above, the additional balance power value (SBPx) of 45 is obtained by multiplying the real power of node 2, 450 in this example, by the coefficient y, which is 0.1 in this example, resulting in the additional balance power value of 45. As explained above, the balance power budget value of 54.9 is obtained by multiplying the total balance power budget of 232 by the ratio of power usage of 0.24 for node 2. As shown in FIG. 4B, the next setting power for the lighter load node 2 is further decreased to 433.5.

FIG. 4C shows the power values for the nodes after the third iteration of the power balancing application is executed. The setting power for the higher power requirement nodes 1 and 3 has been increased from the values in FIG. 4B, while the setting power for the lower power requirement nodes 2 and 4 has been reduced from the values in FIG. 4B.

FIG. 5 is a graph that shows the setting power values of each of the nodes 130, 132, 134 and 136 after performing the power balancing process 10 times from the initial values in the table in FIG. 4A. The setting power values for the nodes 130, 132, 134 and 136 are represented by lines 500, 502, 504 and 506 respectively. As may be seen in FIG. 5, the system load balances power between the nodes allowing increased setting power for higher power requirement nodes such as node 1 represented by the line 500 and node 3 represented by line 504. The setting power is decreased for lower power requirement nodes such as the nodes 2 and 4 represented by lines 502 and 506.

Figure 6:
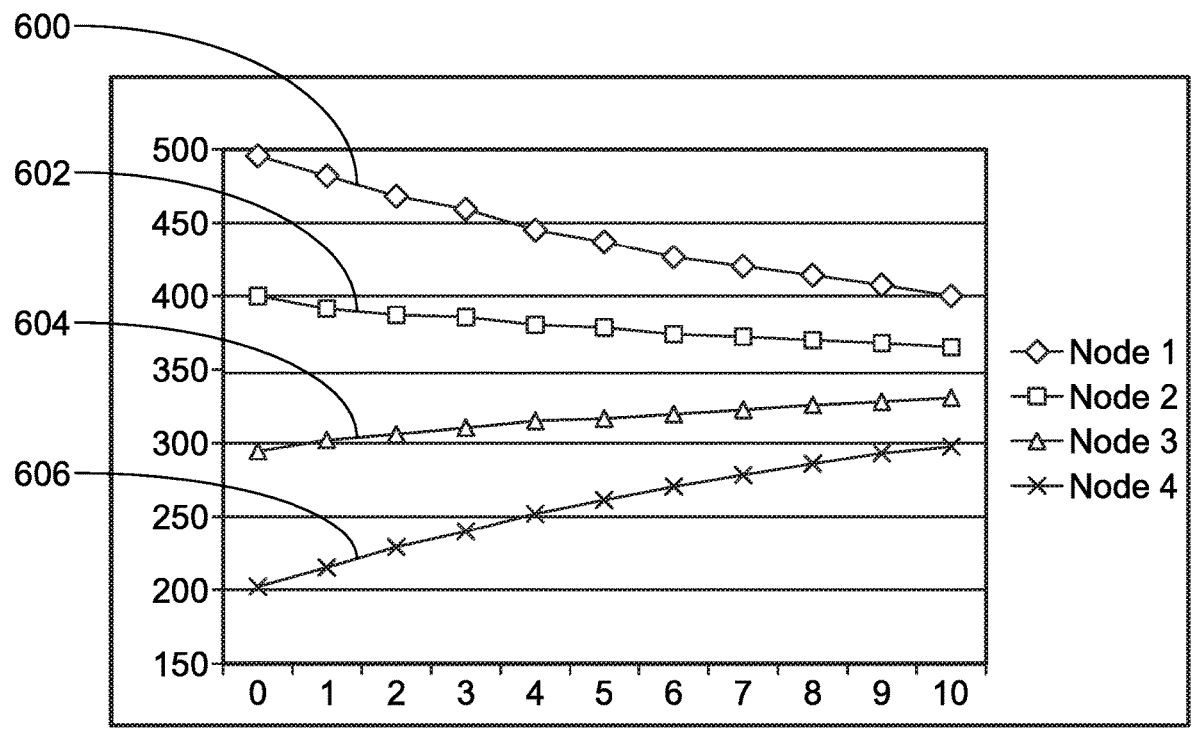
FIG. 6 is a graph of the power supplied to each of the nodes of the system in FIG. 1 after different balancing times based on the power levels in the table in FIG. 2A when the y coefficient is adjusted.

As explained above, the coefficient y may be adjusted to optimize power balancing depending on the needs of the system. In the example described above in relation to FIGS. 2A-2B and FIG. 3, the coefficient y is set to 0.3 in order to allow all the nodes to achieve the same average power as all the nodes need more power. FIG. 6 is a graph that shows the setting power values of each of the nodes 130, 132, 134 and 136 after performing the power balancing process described above ten times with the starting values in FIG. 2A. The setting power values for the nodes 130, 132, 134 and 136 are represented by lines 600, 602, 604 and 606 respectively when the coefficient y is set to 0.1. As may be seen in FIG. 6 compared with FIG. 3, the system load balances at a slower rate thus showing a higher y value is more desirable to balance power when all the nodes need additional power.

Figure 7:
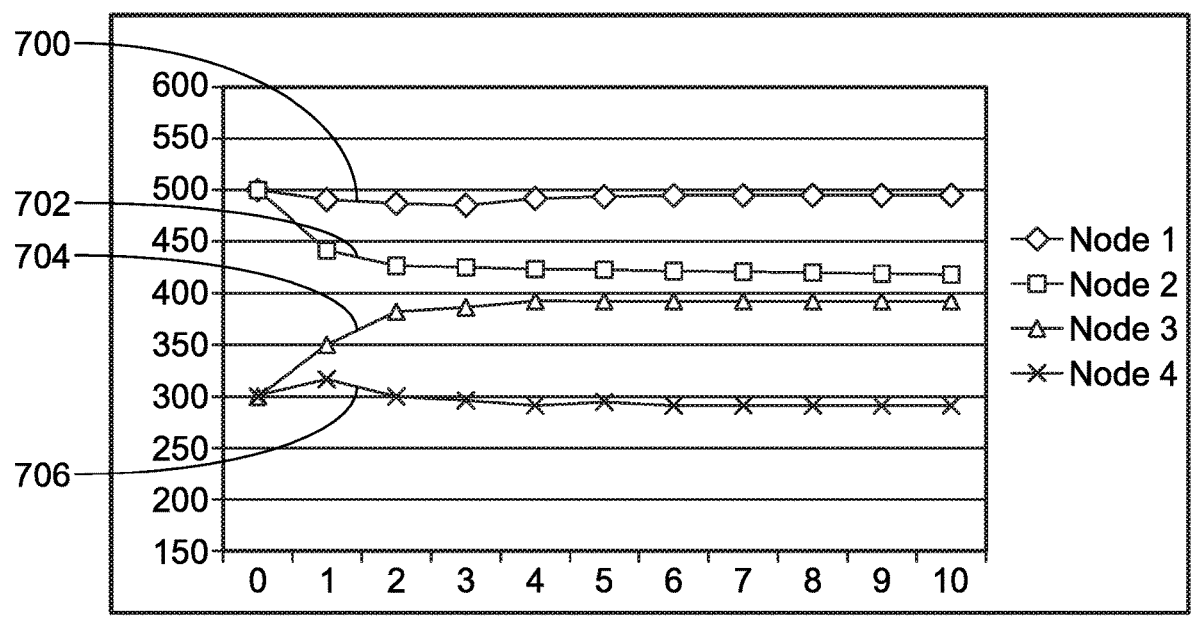
FIG. 7 is a graph of the power supplied to each of the nodes of the system in FIG. 1 after different balancing times based on the power levels in the table in FIG. 4A when the y coefficient is adjusted.

In the example described above in relation to FIGS. 4A-4C and FIG. 5, the coefficient y is set to 0.1 in order to allow higher power requirement nodes to receive more power allocation and lower power requirement nodes to receive less power allocation. FIG. 7 is a graph that shows the setting power values of each of the nodes 130, 132, 134 and 136 after performing the power balancing process described above ten times with the starting values in FIG. 4A. The setting power values for the nodes 130, 132, 134 and 136 are represented by lines 700, 702, 704 and 706 respectively when the coefficient y is set to 0.3. As may be seen in FIG. 7 compared with FIG. 5, the system allocates less power to the nodes that need more power thus showing a lower y value is more desirable to balance power when only some of the nodes need additional power.

Figure 8:
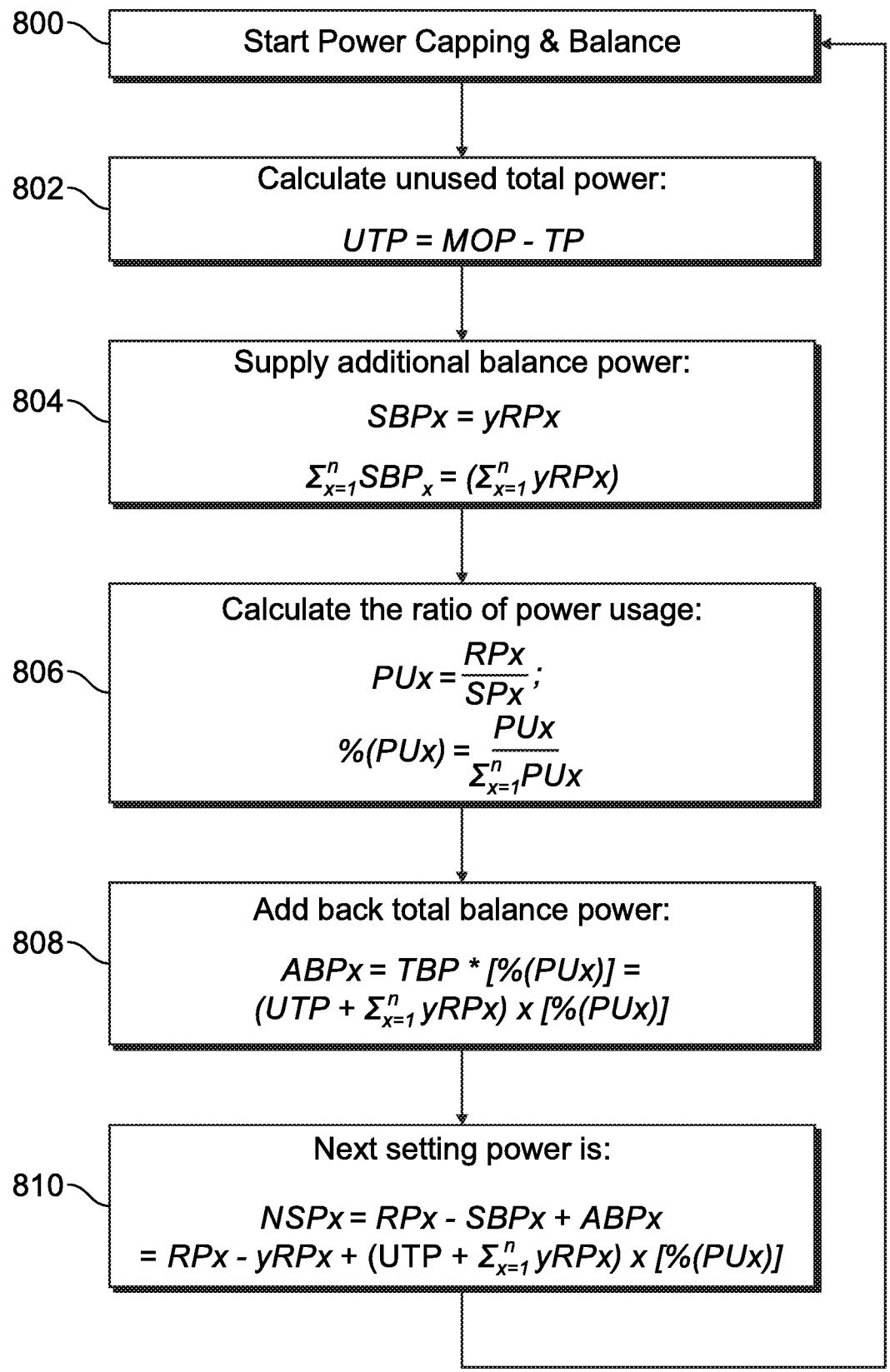
FIG. 8 is a flow diagram of the process of determining power allocation to different nodes in the multiple node system in FIG. 1.

FIG. 8 shows a flow diagram of the algorithm executed by a management controller such as the chassis management controller 142 in FIG. 1 to dynamically distribute power to the nodes of a multi-node system. The flow diagram in FIG. 8 is representative of example machine readable instructions for a multi-node system such as the system 100 in FIG. 1. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowchart of FIG. 8 may be implemented manually. Further, although the example algorithm is described with reference to the flowcharts illustrated in FIG. 8, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The chassis management controller 142 first initiates the power balancing procedure (800). The power balancing procedure may be performed on a periodic basis for a multi-node system or may be initiated in response to a change in operation of one or more of the nodes. The chassis management controller 142 determines the unused total power by taking the overall power output of the power supply unit 102 (MOP) and subtracting the TP (802). The chassis management controller 142 then determines the additional balance power for the system by adding the real power for each node multiplied by the coefficient y (804). The chassis management controller 142 then determines the ratio of power usage for each of the nodes (806). The ratio of power usage for a node is determined by dividing the degree of power usage for a node PUx by the total degree of power usage for all the nodes, PU. The degree of power usage is determined by dividing the real power of the node (RPx) by the setting power of the node (SPx).

The chassis management controller 142 then adds back the total balance power budget to each of the nodes by allocating the total balance power budget between the nodes (808). The added back total balance power for a node (ABPx) is determined by taking the total balance power budget (TBP) and multiplying it by the degree of power usage for the node (% (PUx)). The total balance power budget is determined by taking the unused total power (UTP) and adding the additional balance power determined from real power usage for each of the nodes multiplied by the coefficient y (yRPx).

The chassis management controller 142 then determines the next setting power for each node (NSPx) (810). The next setting power is determined by subtracting the additional balance power (SBPx) for the node from the real power for the node (RPx) and adding the total balance power for the node (ABPx). The chassis management controller 142 then regulates the power supply circuit 106 to supply real power up to the next setting power value to each of the nodes in the system. The process then loops back and rebalances power allocation according to the next setting power for each of the nodes.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms"including", "includes", "having", "has", "with", or variants thereof are used in either the detailed description and/or the claims, such terms are intended to be inclusive in a manner similar to the term"comprising."

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A multi-node system that dynamically allocates power, the system comprising:
    a plurality of nodes;
    a plurality of sensors, each of a subset of the plurality of sensors being associated with a corresponding one of plurality of nodes;
    a power source providing power to each of the plurality of nodes;
    a management controller coupled to the power source and the plurality of nodes, the management controller operable to command each of the plurality of nodes to regulate the power consumption of the node, the management controller further operable to balance the power supplied to each node by:
        determining an initial setting power for each of the plurality of nodes, the initial setting power for each of the nodes determined based on a power consumed by each of the plurality of nodes and a predetermined total setting power of the system;
        determining a next setting power for each of the plurality of nodes based on a determined real power usage, a determined add back balance power, and a determined additional balance power for the plurality of nodes based on a continuous balancing of power between the nodes at the predetermined total setting power of the system, wherein,
            (i) the determined real power usage for each of the plurality of nodes is based on data from the plurality of sensors;
            (ii) a ratio of power usage for each of the plurality of nodes is based on the real power usage of the node divided by a total real power usage of all the nodes based on data from the plurality of sensors;
            (iii) the determined add back balance power for each plurality of nodes is based on a total unused power, based on the total real power usage and the predetermined total setting power of the system, and the ratio of power usage; and
            (iv) the determined additional balance power for each of the plurality of nodes is based on the determined real power usage and a predetermined portion of a load of the node; and
        commanding each of the plurality of nodes to regulate the power consumption of the node up to the next setting power value of the node.

2. The multi-node system of claim 1, wherein the unused total power is determined by subtracting a total power of the system from a power consumption value of the power supply, wherein the total power of the system is determined by at least one of the plurality of sensors.

3. The multi-node system of claim 1, wherein the additional balance power for each of the plurality of nodes is determined by a coefficient of the real power of the node.

4. The multi-node system of claim 3, wherein the coefficient is a fixed value.

5. The multi-node system of claim 3, wherein the coefficient is a dynamic value.

6. The multi-node system of claim 1, wherein each node includes one or more processors, and the system is a multi-node motherboard including each of the plurality of nodes.

7. The multi-node system of claim 1, wherein at least one of the nodes of the plurality of nodes is a system device.

8. The multi-node system of claim 1, wherein the management controller is further operable to repeat the balancing the power supplied to each of the plurality of nodes by using the next setting power for each node for the setting power value for each of the plurality of nodes.

9. A method of managing power in a system including a plurality of nodes, each node consuming power, and a plurality of sensors, the method comprising:
   determining an initial setting power for each of the plurality of nodes, the initial setting power for each of the nodes determined based on a power consumed by each of the plurality of nodes and a predetermined total setting power of the system;
   determining a real power consumed for each of the plurality of nodes based on data from the plurality of sensors;
   determining a next setting power for each of the plurality of nodes based on the determined real power, a total unused power, and a total additional balance power for the plurality of nodes based on a continuous balancing of power between the nodes at the predetermined total setting power of the system; and
   determining a next setting power for each of the plurality of nodes based on a determined real power usage, a determined add back balance power, and a determined additional balance power for the plurality of nodes based on a continuous balancing of power between the nodes at the predetermined total setting power of the system where,
   (i) the determined real power usage for each of the plurality of nodes is based on data from the plurality of sensors;
   (ii) a ratio of power usage for each of the plurality of nodes based on the real power usage of the node divided by a total real power usage of all the nodes based on data from the plurality of sensors;
   (iii) the determined add back balance power for each plurality of nodes based on a total unused power, based on the total real power usage and the predetermined total setting power of the system, and the ratio of power usage; and
   (iv) the determined additional balance power for each of the plurality of nodes is based on the determined real power usage and a predetermined portion of a load of a node; and
   regulating the real power up to the next setting power value to each of the plurality of nodes.

10. The method of claim 9, wherein the unused total power is determined by subtracting a total power of the system from a power consumption value of the power supply, wherein the total power of the system is determined by at least one of the plurality of sensors.

11. The method of claim 9, wherein the additional balance power for each of the plurality of nodes is determined by a coefficient of the real power of the node.

12. The method of claim 11, wherein the coefficient is a fixed value.

13. The method of claim 11, wherein the coefficient is a dynamic value.

14. The method of claim 9, wherein each of the plurality of nodes includes one or more processors, and the system is a multi-node motherboard including each of the plurality of nodes.

15. The method of claim 9, wherein at least one of the nodes of the plurality of nodes is a system device.

16. The method of claim 9, wherein the setting power is set to the next setting power.

17. A chassis management controller for allocating power to a plurality of nodes, the chassis management controller comprising:
   an interface coupled to a power supply circuit supplying power to each of the plurality of nodes;
   a controller regulating the power supply circuit, the controller operative to:
      determine a real power consumed by each of the nodes;
      determine a total unused power of all of the nodes;
      determine an additional balance power for each of the nodes;
      determine a ratio of power usage for each of the nodes based on a power usage of the node divided by the total power usage of all the nodes;
      determine an add back balance power for each node based on the total unused power and the ratio of power usage;
      determine a next setting power value for each node based on the real power consumed by the node, the additional balance power for the node and the add back balance power for the node; and
   commanding each node to regulate the power consumption of the node up to the next setting power value of the node.

\* \* \* \* \*